Dec. 20, 1960

C. L. WANLASS 2,965,767

INPUT CIRCUITS AND MATRICES EMPLOYING ZENER DIODES AS VOLTAGE BREAKDOWN GATING ELEMENTS

Filed July 15, 1955

3 Sheets-Sheet 1

INVENTOR.
CRAVENS L. WANLASS

BY [signatures]

ATTORNEYS

INVENTOR.
CRAVENS L. WANLASS
BY
[signature]
[signature]
ATTORNEYS

INVENTOR.
CRAVENS L. WANLASS

BY [signatures]

ATTORNEYS

United States Patent Office 2,965,767
Patented Dec. 20, 1960

2,965,767

INPUT CIRCUITS AND MATRICES EMPLOYING ZENER DIODES AS VOLTAGE BREAKDOWN GATING ELEMENTS

Cravens L. Wanlass, Whittier, Calif., assignor, by mesne assignments, to Thompson Ramo Wooldridge Inc., Cleveland, Ohio, a corporation of Ohio Filed July 15, 1955, Ser. No. 522,242

13 Claims. (Cl. 307—88.5)

This invention relates to input circuits and matrices employing Zener diodes as voltage breakdown gating elements and, more particularly, to various logical networks which are controlled by bilevel input signals such as may be employed in a digital computer, and which receive synchronizing or clock pulse signals to produce input signals for flip-flops or other bistable elements.

The problems of providing pulse input signals for flip-flops in accordance with predetermined logical functions has been approached in various ways in the prior art. In the early development of the art, pulse-coincidence gating was employed where the logical state of the various flip-flops in a system was indicated by the presence or absence of a pulse or perhaps by pulses of differenet polarity. In a system of this type the "and" function is accomplished by employing output signal pulses of relatively long time duration and synchronizing pulses of a shorter duration. These pulses then are applied to the pulse coincidence circuit. Any output signal which results is then presented to a shaping circuit which is operative to cause a standard output pulse to be generated when all of the input pulses to the "and" coincidence gate are of the proper polarity and amplitude.

While pulse gating circuits of this type have been operated satisfactorily and are still employed to some extent, the necessity of providing correct timing and pulse shaping throughout the system is frequently found to be a prohibitive limitation. This is especially so where reliability in terms of accuracy, to perhaps one part in one billion, is required. Furthermore, even where this extreme reliability is not required, the pulse timing and shaping equipment generally means a substantial increase in circuit cost and complexity.

Pulse coincidence circuits of this type may be found as a matter of background interest in considering the present specification in an article entitled "Diode Coincidence and Mixing Circuits in Digital Computers" by Tung Chang Chen, in volume 38 of Proceedings of the Institute of Radio Engineers on pages 511–514.

In view of the various limitations of the pulse gating technique discussed above, another approach has been frequently adopted and may be referred to as D.-C. gating. In systems of this type the bilevel output signals of the various flip-flops are utilized directly and are not converted to pulses. The system logic then is generated as a function of various D.-C. input signals, the logical D.-C. voltage levels being pulled up at various points through gating resistors.

A system of this type is found, for example, in the disclosure of the patent to Wolfe No. 2,644,887.

One of the major disadvantages of the conventional D.-C. gating systems, such as is shown in the Wolfe patent, is that power must be continuously supplied to the gating circuits from the various information sources or flip-flops. A further limitation is that the gating takes place at a different D.-C. voltage level than the voltage level which must be supplied to the flip-flop circuits in order to change their stable state. This means that it is necessary to A.-C. couple the gated information into the flip-flops, so that some sort of capacitive coupling circuit is specified.

The gating circuit thus must supply enough energy in a given amount of time to charge the capacitor at the maximum repetition rate that the system is required to operate. In addition, the capacitor must be discharged rapidly enough to enable the greater portion of the D.-C. voltage swing at the flip-flop circuit side of the capacitor to be available.

The net result in the D.-C. gating system is that the diode gate resistors must be small enough, considering the value of the capacitor used, in order to ensure the proper time constant for the clock pulse rate; but as these gate resistors are decreased in size, the current and power requirements go up. This has meant that the D.-C. gating system has been limited to its maximum frequency of operation for a given load condition.

Another limitation placed upon the maximum value of the gating resistors employed in the D.-C. gating system is determined by the useful back resistance of the diodes which are used. If this diode back resistance is low, and the value of the gating resistor is high, the back current through a number of diodes may cause an erroneous output signal.

A third type of gating system has been developed which appears to have some of the advantages of both types of systems considered above. In this arrangement D.-C. levels are utilized to specify the logical input signals at the first or lowest gating stage or level, but pulse gating is utilized thereafter. This type of gating may be termed a D.-C. pulse gating system. An arrangement of this type is described in an article entitled "Transistor Circuitry for Digital Computers" by C. L. Wanlass published in the Transactions of the IRE Professional Group on Electronic Computers, volume EC–4, No. 1, March 1955.

As is indicated in this article the D.-C. pulse gating system is advantageous in that appreciable D.-C. power is drawn only during the information transfer period when the clock pulses are applied. This effect is accomplished by arranging all of the gating diodes so that they are biased in the reverse direction except when the clock pulse is present. A simple circuit arrangement of this type is also shown in Fig. 3*a* of the present drawings; being referred to therein as prior art.

As will be more fully understood from the detailed description which follows, the D.-C. pulse gating system, while an improvement over previous arrangements, has certain inherent limitations. In the first place it is still generally necessary to utilize a coupling capacitor as a means of isolating the input circuit to be driven from the D.-C. gating logic in the matrix. This is particularly so in a voltage sensitive system where the input voltage level cannot rise above the lowest level for the logical signal. In a particular case, for example, it may be shown that the voltage triggering level for a vacuum tube flip-flop must be lower than the lowest output signal representing binary zero, when using negative triggering and where no additional buffer amplification means are present at the flip-flop input circuit.

A further limitation of the conventional D.-C. pulse gating arrangement is illustrated in Fig. 3 of the present specification where the typical prior art is compared to one embodiment of the present invention. As is more fully discussed below, the conventional arrangement will always pass some level of false pulse through to the flip-flop input circuit to be driven. Arrangement is made, of course, to ensure that these false pulses do not rise to a triggering level. However, such an arrangement requires fairly accurately regulated supply voltages. If such an accurate regulation is not provided, it will be shown in the discussion which follows, the false pulse amplitude may be increased to the triggering level and/or the true pulse level may be attenuated to where it is indistinguishable from the false pulse.

While the coupling capacitor may not be required in the conventional D.-C. pulse gating system where the flip-flop is current sensitive, some means must be provided then for distinguishing between the true and false pulse levels. In other words, the output signal must be converted into a "true" or "false" representing current signal. One means which has been previously suggested for this conversion is to incorporate a series resistor between the gating circuit and the flip-flop input circuit so that the flip-flop effectively "sees" a high impedance current source driving it. This series resistor may be considered to be a "distinguishing" resistor since the current changes through it will be substantial although the voltage changes may not be otherwise distinguishable.

However, while the series resistor approach is a partial solution, the signal provided still is not an ideal current source.

The present invention obviates the above and other disadvantages inherent in the prior art by providing a circuit arrangement which is virtually open circuited under the same conditions where previously a small pulse would have been produced. As a result, no false pulse occurs. In addition, the technique taught herein provides a very low voltage level input signal, appearing to come from an almost ideal current source.

It will be shown further that the invention makes it unnecessary to utilize a coupling capacitor as a buffer between differing logical signal levels and the flip-flop input signal level. These and other improvements are accomplished through the utilization of a Bener diode as a gating element. The term Bener diode is employed herein to indicate any device having a sharply varying impedance condition as a function of applied voltage thereacross, where the voltage variation occurs in the same polarity sense. Thus a silicon diode may be employed as a Zener diode, a typical characteristic of which will be considered with regard to Fig. 2*a* below.

In a typical arrangement of the invention a Zener diode is employed as one of two diodes connected in series, where the junction of the two diodes receives the synchronizing or clock pulse through an input impedance or resistor. Thus in structural form the invention appears to be similar to the circuits shown in the above-mentioned article by C. L. Wanlass except that at least one diode in each gating circuit is reversed in polarity and has a Zener voltage breakdown characteristic which must be carefully selected in accordance with certain factors considered below.

The essence of the present invention lies in the utilization of this voltage breakdown gating element, or Zener diode, in a D.-C. pulse gating system and in providing proper biasing and pulsing operating levels. It is important in accordance with the teachings of the invention that the selection of the Zener breakdown potential be made so that the desired pulse logic may be achieved.

In one particular arrangement of the invention a buffer circuit is provided which includes two diodes connected in series, the junction of the diodes receiving a positive clock pulse applied through an input resistor. The first diode of the two receives the voltage level control signal at its cathode and its anode is connected to the cathode of a Zener diode, the anode of which provides an actuating or driving signal for a flip-flop. This arrangement will be referred to as a positive buffer circuit since the high level of the input signal causes a positive output pulse to be produced when a positive clock pulse is applied.

The Zener diode characteristic is selected so that the difference between the low level logical signal for the system and the input triggering level of the flip-flop is insufficient to cause a breakdown, whereas the difference between the high level of system logic and the input level is well beyond the Zener breakdown level.

This means that if the input signal applied to the first diode is low, the Zener second diode is not caused to break down since the junction point between the two diodes is clamped at the low level. When this input signal is at its high level, however, the Zener diode breaks down and provides an extremely low impedance current source therethrough. The voltage at the output end of the "or" gating circuit, on the other hand, may be at an extremely low level since the Zener diode when broken down provides an effective battery of reverse polarity with respect to the input signal.

In another arrangement of the invention, a negative buffer circuit is provided where the input signal is applied to a Zener diode and output pulses are derived through a non-Zener diode which may be coupled to the storage element or flip-flop to be driven. In a particular operation this type of circuit is actuated by negative clock pulses through an input resistor connected to the junction of the anode of Zener diode and the cathode of the non-Zener diode. The Zener diode then breaks down during a clock pulse period if the input signal applied thereto is at its high level. The Zener diode breakdown potential is selected so that the negative swing at the junction of the two diodes cannot reach the triggering level. In other words, the Zener potential is selected to be well above the input bias level, referred to hereinafter as $E_i$.

On the other hand, when the input signal applied to the Zener diode is at its low level, the Zener diode does not break down and effectively an open circuit exists between the clock pulse source and the flip-flop output driving source. In this case then the clock pulse negative signal is transmitted through the input impedance and the second diode provides an actuating output signal which may be utilized to trigger a flip-flop. The term negative buffer is thus used to indicate a circuit where the low or negative level of an input signal controls the generating of a negative output signal in response to a negative clock pulse.

The two circuits just described, namely the positive and negative buffer circuits are the simplest embodiments of the invention. A multitude of other arrangements are possible and will be described below wherein several of the basic "and" and "or" circuits are arranged into different forms of matrices. In all of these arrangements, however, at least one Zener diode is employed coupled between a driving source, such as a flip-flop, and a receiving stage, which also may be a flip-flop.

Besides providing a considerable number of matrix variations the invention also contemplates the inclusion of other non-Zener diodes to improve the operation of the basic circuits. The expression "non-Zener" diode as employed herein is intended to signify a diode which does not have a Zener breakdown potential within the region of voltage operation of the circuit. Thus an additional non-Zener diode may be employed with the positive "or" circuit, being coupled between the Zener diode and the input circuit to be driven. This second non-Zener diode may have its anode connected to the anode of the Zener diode and its cathode coupled to the input circuit to be driven.

In operation, the second non-Zener diode serves to allow a considerable variation in the clock pulse level prior to the pulse period; being arranged so that it is back biased before the clock pulse period and is forward biased during the clock pulse period.

A similar arrangement may be made for the negative buffer circuit where an additional diode is interposed between the input driving source and the Zener diode. In particular, in the negative "and" circuit the second non-Zener diode has its cathode connected to the cathode of the Zener diode, the anode of the non-Zener diode receiving the input signal. This second non-Zener diode is in a back biased state prior to the application of the negative clock pulse, preventing the passage of any current through the Zener diode. If the input signal then is at a high level, the second non-Zener diode is forward biased during the clock pulse period.

Another improvement which is possible is the inclusion of a non-Zener diode connected in parallel with the clock pulse input resistor. This non-Zener diode is arranged so that it would be forward biased due to the drop of potential across the clock pulse resistor. In this manner then the effect of spurious signal changes at the junction of the basic Zener and non-Zener diodes may be eliminated since the gating circuit is effectively clamped at the preclock pulse level when the clock pulse is not applied.

In the positive buffer circuit this additional diode is connected with its anode at the junction of the two basic diodes and its cathode is connected to the other end of the clock pulse resistor which receives the applied clock pulse. In the negative buffer circuit the diode is connected with the cathode at the junction of the two basic diodes and its anode is connected to the other end of the clock pulse resistor which receives clock pulses.

In addition to showing the invention as it may be employed in various gating circuits and matrices, an attempt is also made herein to describe the function of the invention as it is associated with various flip-flop types. Thus a one-stage counter is shown utilizing a transistor flip-flop and the negative "and" gating circuit of the present invention; and a similar circuit is shown with a vacuum tube flip-flop and the positive "or" gating circuit of the invention. It will be understood, of course, that the particular flip-flop which is employed is unimportant for present purposes and that the arrangement shown merely illustrates one of many practical applications of the invention.

Accordingly, it is an object of the present invention to provide a pulse gating circuit wherein direct coupling may be employed throughout without requiring the continuous provision of power.

Another object of the invention is to provide an improved pulse gating circuit obviating the limitations of the conventional pulse coincidence and D.-C. gating systems through the employment of a Zener diode as a voltage breakdown element.

A further object is to provide a pulse gating circuit wherein no coupling capacitor is required between the input signals and the storage circuit or flip-flop to be driven.

Still another object is to provide an improved pulse gating circuit for driving current sensitive devices.

Yet a further object is to provide a pulse gating circuit for a current sensitive flip-flop, such as a transistor flip-flop, without the necessity of a coupling capacitor.

A more specific object of the invention is to provide an improved "or" gating circuit wherein a Zener diode is employed as a voltage breakdown element between the clock pulse driving source and the input circuit to be driven.

Another specific object is to provide an "and" circuit wherein a Zener diode is employed as a voltage breakdown element between the input signal source and the clock pulse source.

Yet another specific object of the invention is to provide "and" and "or" logical circuits wherein Zener diodes are employed to provide an effective current source for driving a storage element.

A further specific object of the invention is to provide logical matrices employing "and" and "or" circuits wherein at least one level of logic is mechanized through the utilization of Zener diodes to perform a voltage breakdown function in accordance with the input logic.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 illustrates several basic embodiments of the invention;

Fig. 2 provides a graphical representation of the manner in which the Zener breakdown potential and clock pulse potential are selected;

Fig. 3 provides a comparison of a typical prior art circuit shown in (*a*) with the positive buffer of the invention shown in (*b*), typical waveforms by way of comparison being shown in (*c*);

Figure 1:
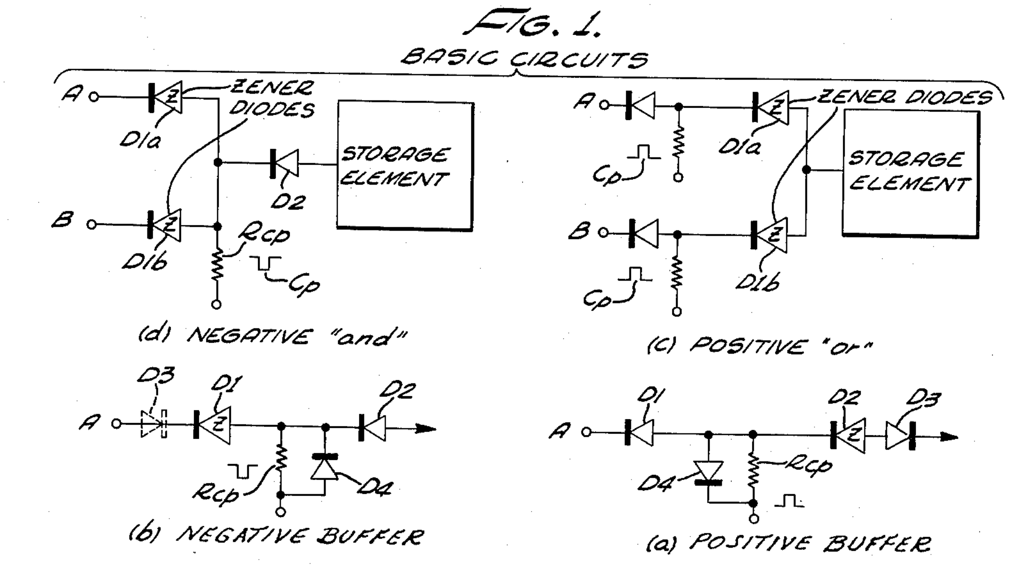

Reference is now made to Fig. 1 wherein several typical circuit embodiments of the present invention are shown. As indicated in Fig. 1*a*, a positive buffer embodiment of the invention includes a first non-Zener diode D1 connected in series to a second Zener diode D2. Clock pulses are then applied to the junction of these two diodes through clock pulse resistor $R_{cp}$. In particular, diode D1 receives an input signal A applied to its cathode and the anode thereof is connected to the cathode of Zener diode D2, the anode of which may provide an actuating output pulse for a storage element or flip-flop. In this case then the clock pulses applied to resistor $R_{cp}$ are positive and positive levels of signal A cause positive output pulses to be generated.

Diodes D3 and D4 shown in Fig. 1*a* are not required for the positive buffer of the invention but are desirable for the reasons given below. Diode D3 is shown to have its anode connected to Zener diode D2 so that its cathode then provides the output pulse. This diode is arranged to be back biased prior to the application of the positive clock pulse so that the low clock pulse level does not cause conduction through Zener diode D2. In other words diode D3 prevents the unnecessary dissipation of power through Zener diode D2 and consequently eliminates incorrect triggering prior to the clock pulse interval even though the input level of the stage to be driven is higher than the prepulse level of the clock pulse.

Diode D4, the other optional diode shown in Fig. 1*a* is connected in parallel to resistor $R_{cp}$. In particular diode D4 has its anode connected to the anode of D1 and the cathode connected to the input terminal receiving the positive clock pulse. The purpose of diode D4 is to prevent the junction between diodes D1 and D2 from rising above the preclock pulse level. In this manner then it is practically impossible for transient variations in the input signal A to pass through the gating circuit so that they may appear to be actuating signals on the other side of Zener diode D2. Actually, however, this probability is very slight in view of the considerable back impedance which may be obtained through two series diodes such as D1 and D2. However, the inclusion of diode D4 provides an additional assurance that a spurious signal may not be D.-C. coupled to the input circuit which follows.

The operation of the circuit of Fig. 1*a* may be better understood by considering the diagrams of Figs. 2*a* and 2*b*. In Fig. 2*a* a typical characteristic of a Zener diode is shown where the Zener diode breakdown potential Ez is approximately 10 volts, the impedance after breakdown is approximately 10 ohms, and the impedance in the back biased region prior to breakdown is approximately 100 megohms.

The operation of the invention then is shown by illustrating typical prior art pulses P*a* indicated in dotted lines and the utilization of pulses P*b* in acordance with the present invention, pulses P*b* being shown in solid lines. It will be noted then that pulses P*a* have polarity variations which cross from the back biased region of the diode to the forward biased region. In other words, the conventional technique is to achieve a gating function utilizing diodes by operating them in either their back or forward biased region. In utilizing the present invention, on the other hand, the Zener diodes are always operated in either the back biased region or the Zener breakdown region which exists in the same polarity sense. In other words the potential applied across the Zener diode is always in the back biasing direction and either causes breakdown or does not.

In the conventional approach then both the true and false pulses cause an output signal although the true pulse is considerably greater than the false pulse. In practicing the present invention, on the other hand, no breakdown is caused at all by the false pulse since it does not reach the Zener breakdown level, whereas the true pulse is always effective in the same manner because of the effective signal-regulating action provided by the Zener diode. This will be further described below.

The typical operating potentials for employing the circuit of Fig. 1*a* are illustrated in Fig. 2*b*, where the level E*h* represents a high logical level which may indicate a binary "1" for a computer, and the level E*l* represents a low level which may represent a binary "0." It will be noted then that the Zener breakdown level Ez is selected to be between the level E*h* and E*l*. Finally it will be noted that the input triggering level for the flip-flop to be actuated is represented as E*i* and is below E*l*. Typically where transistor flip-flops are employed E*h* may be about 15 volts, E*l* about 1 volt and E*i* very near ground potential, at perhaps about .25 volt.

Potential Ez then may exist anywhere between the levels E*l* and E*h*, a suitable potential being in the region between 7 and 10 volts. With these illustrative potentials then the positive clock pulse utilized need only exceed potential Ez in order to be suitable since a positive potential at this level would cause a breakdown of a diode D2 providing that the input signal A applied to diode D1 is at high level E*h*. It will be noted, however, that the clock pulse illustrated is considerably greater in amplitude than E*h*, in the neighborhood of 30 volts, in order to provide the desired actuating current. However, it should be borne in mind that the important consideration is simply that E*l* be below Ez and E*h* be above Ez so that no breakdown is caused in diode D2 when a clock pulse is applied if level E*l* is present causing diode D2 to be forward biased, but breakdown can occur when signal A is at level E*h* back biasing diode D1.

It is important to note that the voltage which appears at the other side of D2 at the input circuit to be driven does not vary to any great extent for the true and false input conditions although the current therethrough is substantially zero for the false condition and is considerable for the true condition. The reason for this is that the voltage output condition is attenuated for both possible input conditions of the input signal A. When the signal A is high representing a true or one signal, the output voltage is still low due to the effective biasing action of the breakdown potential of diode D2 and the low input impedance of the flip-flop circuit. Thus when D2 breaks down the output potential is still quite low due to the voltage drop across resistor R*cp* and the further drop due to the battery action of diode D2 and the low flip-flop input impedance.

Figures 2, 3:
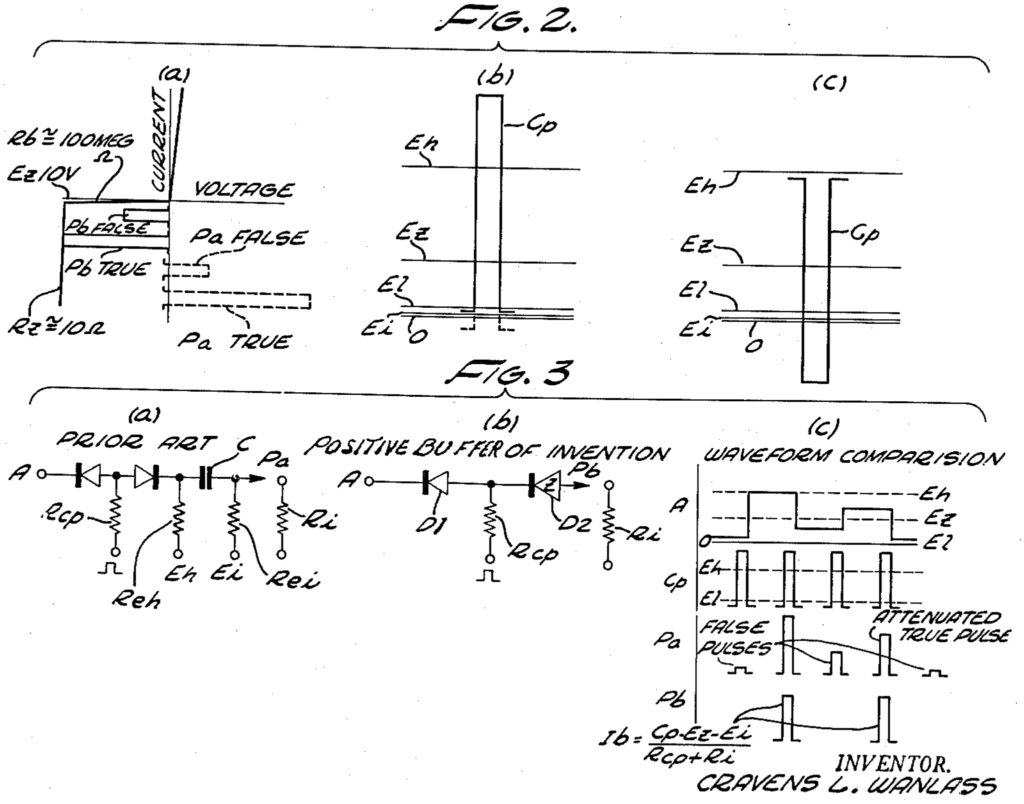

Thus in this manner the output signal derived through diode D2 appears to come from a constant current source through a relatively high impedance clock pulse resistor R*cp*. The improvement which is achieved through this action will be further understood when Fig. 3 is considered below.

It will be noted that two possible starting points for the positive clock pulse applied to the circuit of Fig. 1*a* are shown in Fig. 2*b*. The solid line starting point is shown between E*i* and E*l* to indicate that if provision is made to ensure this operation the diode D2 will always be back biased, since prior to the clock pulse period the level of the clock pulse is greater than E*i* and prevents conduction through D2, and after the clock pulse is applied diode D2 is either broken down in the back biasing region or is back biased without being broken down.

However, it is not necessary to restrict the clock pulse signal level in this manner if other provision is made to prevent current conduction prior to the application of the clock pulse. As indicated, this may be accomplished through the inclusion of diode D3 so that any clock pulse level below E*i* is suitable for a starting level since diode D3 then is back biased prior to clock pulse time.

Another basic variation in the invention is shown in Fig. 1*b* illustrating the negative buffer. The operation of Fig. 1*b* will be described with reference to Fig. 2*c* where a negative clock pulse is indicated along with the same signal level illustrated in Fig. 2*b*. In the negative buffer circuit the Zener diode is diode D1, or the input diode, and the non-Zener diode is diode D2 or the output diode providing an actuating signal. The clock pulse resistor R*cp* then is connected to the junction of diodes D1 and D2 as before.

The circuit of Fig. 1*b* is referred to as a negative buffer since a negative output pulse is produced when input signal A is at a low or negative level and a negative clock pulse is applied to resistor R*cp*. Thus in Fig. 2*c*, illustrating the typical magnitudes of signals employed, it will be noted that the Zener diode potential of diode D1 is exceeded only when input signal A is at its high level E*h* and the negative clock pulse is applied. If signal A were at level E*l* no breakdown would occur since the potential difference across diode D1 is limited to the difference between E*l* and E*i*.

Thus in the circuit of Fig. 1*b* an actuating signal is passed through diode D2 only when diode D1 does not break down, since it is at this time that the level of the signal at the junction of diodes D1 and D2 may fall below the flip-flop input potential. In other words if signal A is at the high level E*h* it is impossible for the level at the cathode of diode D2 to fall below the necessary triggering input level E*i*. On the other hand, with the proper selection of Zener breakdown potential it is impossible for the diode D1 to break down when the level of the input signal A is low so that an actuating signal is then provided through diode D2.

As in the embodiment of Fig. 1*a* other modifications are possible which may enhance the operation of the circuit. A diode D3, for example, may be interposed between the input signal A and the diode D1 and arranged so as to be back biased prior to the application of the clock pulse so that the Zener diode D1 does not conduct. In a similar manner diode D4 may be connected in parallel to the clock pulse resistor R*cp* to prevent the spurious transition of signals through diodes D1 and D2 through a D.-C. coupling path.

As indicated in Figs. 1*c* and 1*d* the basic positive and negative buffers may be duplicated to provide more complicated functions. Thus the circuit of Fig. 1*c* provides an output signal representing the function $A+B$, where the plus sign indicates the logical inclusive "or." The circuit of Fig. 1 then is operative to provide an output signal for actuating a storage element when either the signal A or the signal B is in a high level state.

In a similar manner the negative "and" may be employed to produce an output actuating signal when all input signals are in a low level position so that the circuit of Fig. 1*d* provides a negative actuating pulse whenever both signals A and B are at a low level. It is under these conditions that neither of Zener diodes D1*a* or D1*b* breaks down and that therefore the negative level with a signal at the cathode of diode D2 is enabled to fall below the triggering input level E*i*.

As indicated above, the improvement of the invention may be better understood by considering a typical comparison of the prior art. Thus in Fig. 3 a typical pulse gating circuit is shown in (*a*) where a positive actuating pulse P*a* is produced when input signal A is in a high level state, otherwise no pulse is gated. In comparison, then, the buffer "or" of the invention is shown in Fig. 3*b* where the same signal A constitutes the input signal and the output signal is referred to as pulse P*b*. The waveforms of these two circuits in operation then are shown in Fig. 3*c*.

Before considering the comparative operation of Fig. 3*c* it is interesting to note the relative complexity of the prior art gating arrangement shown in Fig. 3*a*. Thus it will be noted that in addition to the two gating diodes the junction of which receives the clock pulse through resistor R*cp*, there are further required two biasing resistors R*eh* and R*ei* receiving potentials E*h* and E*i*. And finally a coupling capacitor C is required.

This additional circuitry has previously been required in order to ensure that true and false pulses may be distinguished and in addition to allow the actuation of a flip-flop input circuit at a level which is different from that of the output signal levels.

In Fig. 3*c* input signal A is shown as varying considerably from the desired upper and lower limits E*h* and E*l*. The conditions are exaggerated in order to illustrate how the two types of gating circuits shown in Figs. 3*a* and 3*b* are affected.

It will be noted then that when signal A rises from its lower level E*l* the false pulse which may pass through coupling capacitor C rises accordingly and may in fact approach the triggering level. It is for this reason that provision must be made to ensure the fairly accurate regulation of the various input and control signals. In a similar manner the output pulse P*a* is attenuated in amplitude whenever the input signal A falls from the desired true state.

When the present invention is employed, however, no pulse may pass through unless the signal variations in A are so great as to exceed the Zener voltage. Thus the low level E*l* may rise to the level E*z* before an erroneous signal would pass, or the true level may fall to E*z* before a signal will not pass. Otherwise, the output pulses P*b* are not affected in the least.

Furthermore, the output pulses P*b* are current signals indicated in Fig. 3*c* to have an amplitude $$Ib = \frac{Cp - Ez - Ei}{Rcp + Ri}$$

where R*i* is the input impedance of the device to be actuated.

It should be apparent from this example that utilization of the present invention allows a greater variation in the amplitude of the input signals without causing any erroneous operation. This means in turn that a greater operating load may be driven by a gate input device for the same trigger current rating thereof, or depending upon the gate input device it may mean that the same system may operate at a higher frequency for the same load.

Figure 4:
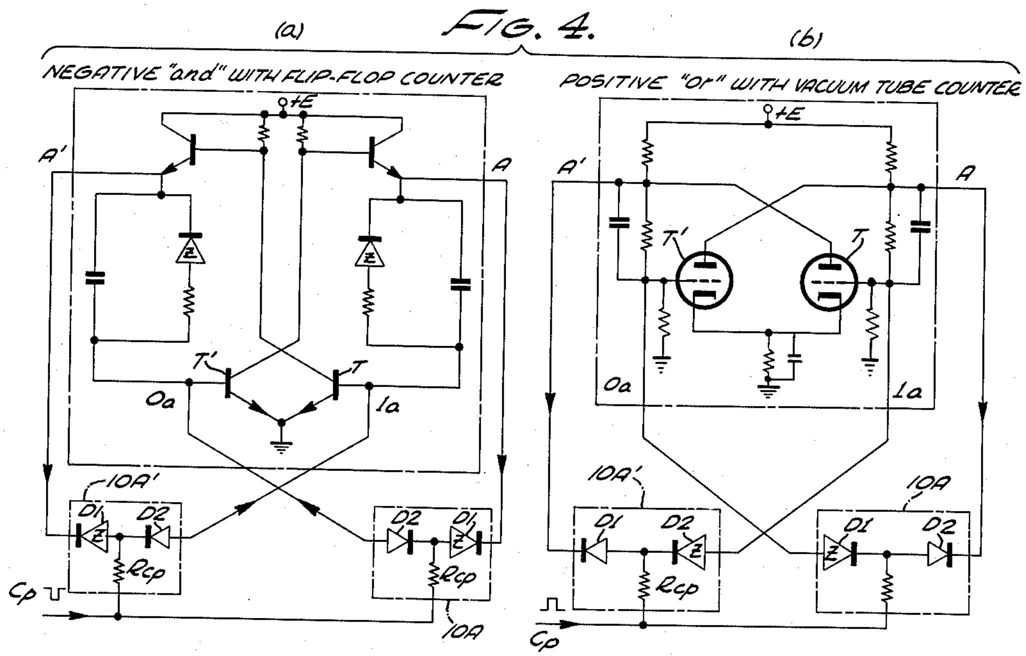
Fig. 4 shows how the invention may be employed in a one-stage flip-flop counter, where (*a*) shows the utilization with a transistor flip-flop and (*b*) shows the utilization of the invention with a vacuum tube flip-flop.
Figure 7:
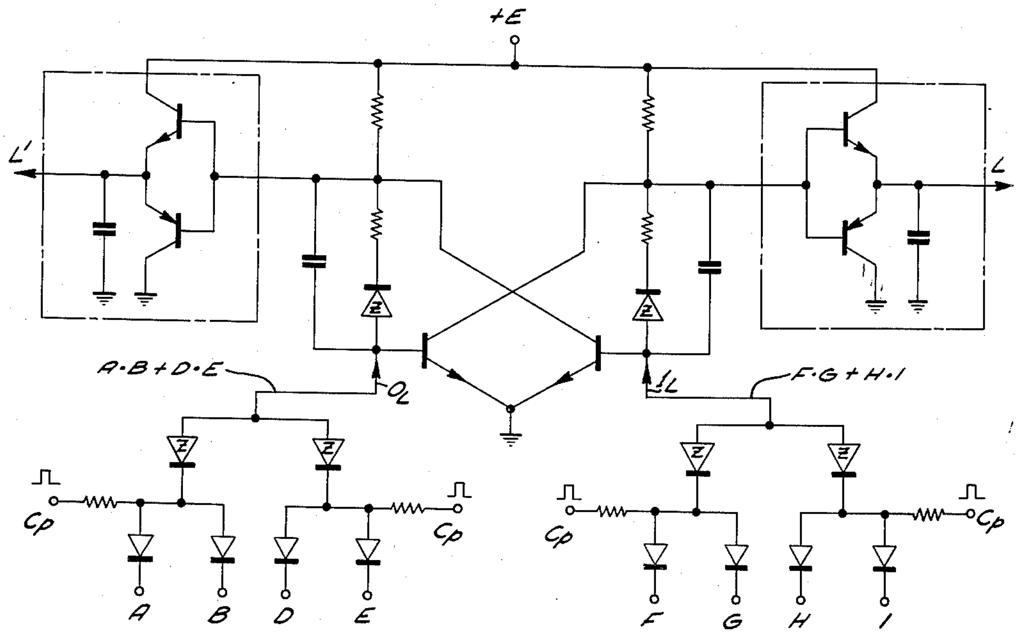
Fig. 7 illustrates another matrix employing the invention wherein the Zener diodes form an "or" circuit, and positive clock pulses are utilized.

An important application of the invention is illustrated in Fig. 4 where two typical types of one stage counters are shown. In Fig. 4*a* a transistor counter is illustrated and the negative "and" circuit of the invention is employed to provide the desired triggering logic. It will be understood, of course, that the positive triggering logic may be employed as well and in fact may be preferable for the transistor circuit. This variation is shown in Fig. 7 which will be considered below.

As indicated in Fig. 4*a* the output signals A and A′ (the complement of A), of the transistor flip-flop are fed back to two input gating circuits 10A and 10A′, respectively. Each of these input circuits then will be noted to be the buffer "and" of the invention, so that a negative pulse is passed through the associated diode D2 when the applied input signal is at a low level. The actuating signals provided by input circuits 10A and 10A′ then are applied respectively to the input circuits O*a* and l*a* of the flip-flop. When signal A is in a low state, then Zener diode D1 in circuit 10A does not break down and a negative clock pulse passes through diode D2 and tends to cut off transistor T′ so that the flip-flop is triggered and the output signal A tends to rise. When the next negative clock pulse is applied, signal A′ is in its low state so that input circuit 10A′ provides an actuating signal through its diode D2. This then is applied to transistor T and causes a triggering of the flip-flop to the other state where the output signal A′ is at a high level.

The particular transistor flip-flop shown in Fig. 4*a* is not important except as it illustrates application of the present invention with a preferred type as is fully described and claimed in copending application for Multivibrator Circuits Employing Voltage Break-down Devices, by Cravens L. Wanlass, Serial No. 513,426, filed June 6, 1955. In addition, certain improved features are shown in this flip-flop which are described and claimed in copending application for Multivibrator Circuits With Improved Power-Frequency Capacity, by C. L. Wanlass, Serial No. 527,355, filed August 9, 1955, now Patent No. 2,916,637.

A similar operation may be effected with a vacuum tube flip-flop such as is shown in Fig. 4*b*. In Fig 4*b* the input circuits 10A and 10A′ are the buffer "or" of the invention so that a positive actuating pulse is provided whenever the input signal is at a high level. In this arrangement then when signal A is at a high level a positive pulse is applied to the input circuit O*a* driving tube T′ into conduction so that the flip-flop is triggered and signal A then falls to a low level. When signal A′ then is in a high level state, a pulse C*p* is effective to break down the diode D2 and provide actuating current again causing the triggering of the flip-flop, whereupon signal A′ falls to a low level.

Figure 5:
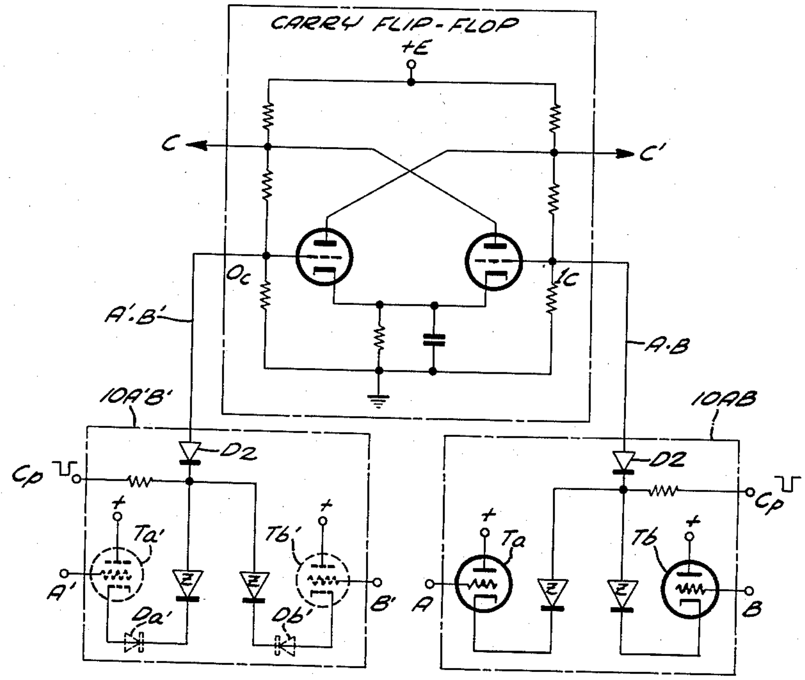
Fig. 5 shows a typical matrix employing the invention wherein negative clock pulses are employed and Zener diodes form negative "and" circuits.

A simple matrix utilization of the negative "and" circuits of the invention is illustrated in Fig. 5. In this case the input logic for a carry flip-flop C is provided, where flip-flop C is set to a 1-representing state whenever both the input signals A and B are present, corresponding to the carry in a serial binary addition, and flip-flop C is set to a 0-representing state when both signals A and B are absent, or the complementary signals A′ and B′ are both present. The input circuits 10AB and 10A′B′ are similar to the basic circuit shown in Fig. 1*b* except for the inclusion of triodes T*a*, T*b*, T*a*′ and T*b*′. These tubes are optional and their purpose is the same as diodes D3 considered above with respect to Figs. 1*a* and 1*b*, that is they prevent the forward biasing of the Zener diodes prior to the application of the negative going portion of the clock pulse. Thus if the triodes are utilized the positive state of the clock pulse prevents any conduction therethrough, whereas the triode may conduct and function as a cathode follower to apply the associated input signal to the Zener diode during the clock pulse period.

Figure 6:
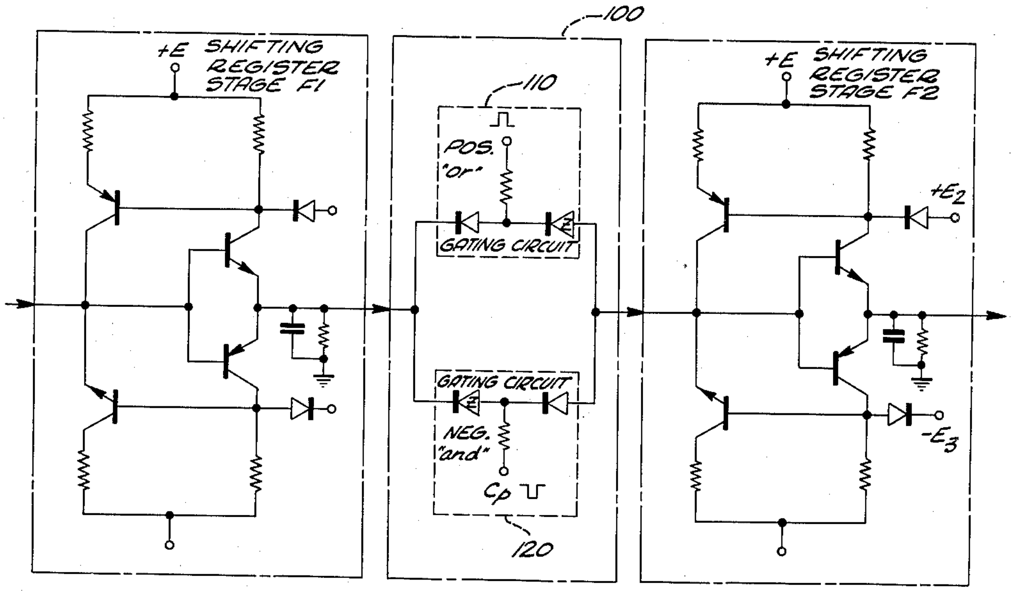
Fig. 6 illustrates the employment of the invention in a shifting register where a single input signal is converted into double polarity output signals suitable for driving a flip-flop.

Another important variation of the invention is shown in Fig. 6 in the form of a coupling circuit 100 between two stages of a shifting register. Coupling circuit 100 consists of the combination of two gating circuits 110 and 120 corresponding to the positive "or" of the invention and the negative "and" of the invention. With the proper selection of the biasing potential and Zener diode characteristics this circuit may then be operated to provide positive and negative actuating output signals when the input level is high and low, respectively. Thus when the first stage F1 of the shifting register provides a high output signal a positive signal is applied to the second stage setting it to a 1-representing state, thus effectively shifting the signal in the first stage to the second stage. In a similar manner when the signal of the first stage F1 is in a low state, a negative signal is applied to the second stage causing it to assume a 0-representing state.

While other types of transistor flip-flops may be employed with the positive and negative pulse producing circuit 100, a suitable type is shown therein by way of illustration. This flip-flop is a current feedback flip-flop as is more fully described in copending application for Current Feedback Multivibrator Utilizing Transistors by Cravens L. Wanlass, Serial No. 527,191, filed August 9, 1955, now Patent No. 2,916,636.

As a final illustration of the considerable class of matrix functions which may be provided through the utilization of the present invention a network is shown in Fig. 7 providing input signals for a flip-flop L defined in accordance with the logical functions $$0_D=AB+DE$$
$$\overline{1_L=FG+HI}$$

In the matrix shown in Fig. 7 the positive pulse logic of the invention is employed where the zener diode appears in the "or" gating function coupled directly to the input circuit of the flip-flop, illustrated to be a transistor flip-flop of the preferred type mentioned above. It is believed that the particular mechanization of the network shown in Fig. 7 will be apparent from the previous discussion, the important thing to note being that the lower level or "and" logic is provided in the conventional manner whereas the higher level or "or" logic is provided through the Zener diodes. The circuit operation is similar to that described above with reference to Figs. 1*a* and 3*b*.

From the foregoing discussion it is apparent that the present invention provides a multitude of input circuits and matrices which are not subject to the various disadvantages of the conventional gating circuits.

Thus, the complexity and difficulty of pulse time synchronization of the pulse coincidence circuits of the prior art are obviated, the undesirable power consumption of the D.C. level technique is avoided, and the relative complexity and undesirable sensitivity of the prior art D.C. pulse gating technique is avoided.

It has been shown that the invention provides a means of direct-current coupling between a driving input signal and a device to be actuated, such as a flip-flop.

It has also been shown that the utilization of Zener diodes in accordance with the invention makes it possible to achieve an almost ideal current source so that the technique described herein is especially well adapted for driving current sensitive devices, such as transistors. It will be understood of course that the invention is not so limited.

It will also now be apparent that the Zener diode technique taught herein makes it unnecessary to have very accurately regulated input signals and further that less power is required from the driving sources for the same frequency of operation.

While only a few representative types of embodiments of the invention have been shown herein, it should be apparent that the basic technique may be practiced in almost an infinite class of structure. Accordingly, it should be recognized that the invention must be defined in terms of the particular selection of the Zener diode characteristic specifying the operating logic desired, rather than in terms of any particular structure.

It is to be noted further that the use of the terms potential E*h* and E*l* are not to be limited to positive and negative potentials. For example, both potentials may be either positive or negative or one may be positive and the other negative. For example, E*h* may be positive and E*l* may be negative or E*h* may be negative and E*l* positive. Similarly, both may be positive and both may be negative, E*h* always indicating the potential at which an associated Zener diode is provided with the greatest back bias rather than whether it is more positive or more negative.

Thus, it is expected that those skilled in the art will be enabled to formulate a considerable number of other variations without departing from the spirit of this invention.

What is claimed as new is:

1. In a logical switching system where two level signals are utilized to represent binary digits, one binary digit value being specified by a high-level signal and the other by a low-level signal, the system also including two state elements which may be actuated into binary value representing states in response to input pulses rising above a predetermined bias level; an input circuit for providing a direct current path to a two state element for applying an actuating pulse to said element under certain conditions, said input circuit comprising: a first diode for receiving a binary value representing signal; a second diode coupled to said first diode for providing an actuating output pulse for a certain predetermined condition in said binary value representing signal applied to said first diode; an impedance having one end coupled to the junction of said first and second diodes, one of said diodes having a Zener breakdown potential in the region between said high-level and said low-level signal and being connected to the other diode so as to receive a signal level greater than said Zener breakdown potential on the occurrence of said predetermined condition in said binary value representing signal, the other diode having a Zener breakdown potential substantially greater than said high-level signal; and means for applying clock pulses to the other end of said impedance, said clock pulses varying between a first limit exceeding the Zener breakdown level for one condition of said binary value representing signal and a second limit less than said Zener breakdown potential for the other condition of said binary value representing signal.

2. The input circuit defined in claim 1 wherein said one diode is said second diode and has one electrode coupled to said two-state element to be actuated and a second electrode coupled to said first diode, the arrangement thereby constituting a buffer gating circuit wherein said second diode is caused to break down upon application of said clock pulse whenever said binary value representing signal applied to said first diode is at its high level.

3. The input circuit defined in claim 2 wherein said second diode has a cathode connected to the anode of said first diode, the anode of said second diode providing an output signal which may be directly coupled to said two state element, said clock pulse being a positive-going pulse initiating at a level between said bias level and said low level or substantially in that region, and reaching a positive peak substantially at the level of said high level signal.

4. The input circuit defined in claim 1 wherein said one diode is said first diode having said Zener breakdown potential between said high and low level signals and said other diode is said second diode, said input circuit providing an "and" gating function.

5. The input circuit defined in claim 4 wherein each of said diodes has an anode and a cathode, the anode of said first diode being coupled to the cathode of said second diode, the anode of said second diode providing an output pulse which may be utilized to directly actuate a two state element and the cathode of said first diode receiving said binary value representing signal, said clock pulses being negative pulses.

6. A pulse gating circuit for providing a direct current path for an actuating signal when an applied two-level control signal is in a high level state and a positive synchronizing pulse is applied, said pulse gating circuit comprising: a first unidirectional device for receiving the two level control signal; a second unidirectional device coupled to said first unidirectional device; and a synchronizing signal input impedance coupled to the junction of said first and second unidirectional devices; said second unidirectional device having a Zener breakdown potential less than the high level of said control signal and being connected to said first unilateral device so as to receive a potential equal to or exceeding said Zener breakdown potential when said two-level control signal is in a high-level state whereby the application of a synchronizing pulse exceeding said Zener breakdown potential causes a breakdown of said second unidirectional device if said control signal is in its high-level state providing said actuating signal and said first unidirectional device being arranged to be forward biased by said synchronizing pulse.

7. A pulse gating circuit for providing a direct current path for an actuating signal when an applied control signal is in a low level state and a negative synchronizing pulse is applied, said pulse gating circuit comprising: a first diode for receiving the two level control signal; a second diode coupled to said first diode for providing the actuating signal; and a synchronizing source input impedance coupled to the junction of said first and second diodes, said first diode having a Zener breakdown potential less than the high level of said control signal whereby the application of a synchronizing pulse exceeding said Zener breakdown potential causes breakdown of said first diode if said control signal is in its high level state, an actuating signal resulting when said control signal is in its low level state and said first diode does not break down.

8. The pulse gating circuit defined in claim 7 wherein there is further included at least one other first diode coupled in parallel to said previously mentioned first diode, thereby providing an "and" circuit wherein an actuating pulse is provided when both control signals applied to said first diodes are at low levels, neither device then breaking down.

9. An input circuit for triggering a flip-flop having first and second input electrodes, the flip-flop having means for producing first and second two-level output signals representing first and second stable states of said flip-flop, respectively, said input circuit comprising: a first diode for receiving one of said output signals; a second diode coupled between said first diode and one of the input electrodes of said flip-flop; and an impedance for applying trigger pulses to the junction of said first and second diodes; one of said diodes having a Zener breakdown potential between the high and low signal levels of said output signals, and the other of said diodes having a Zener breakdown potential which is greater than the high level of said output signal; the triggering pulse being selected to cause a Zener breakdown in said one diode when the associated output signal is in a high level state.

10. The input circuit defined in claim 9 wherein the Zener breakdown characteristic of said one diode is selected to provide an effective current source for a transistor flip-flop, where the signal appearing at the input electrode of said transistor flip-flop derived through said one diode provides the required actuating current for said transistor flop-flop at a low voltage.

11. The input circuit defined in claim 9 wherein said first diode is said one diode having a Zener breakdown potential between said high and low output signal levels, said triggering pulse being a negative going pulse, whereby an actuating signal is provided for said flip-flop whenever the output signal applied to said first diode is in a low level state at which time said first diode does not break down, said first diode also being operative to permit the triggering pulse to fall below the triggering level for said flip-flop.

12. The input circuit defined in claim 9 wherein said second diode is said one diode having a Zener breakdown potential between said high and low signal levels, said triggering pulses being positive-going pulses, causing a breakdown of said second diode to provide actuating current for said flip-flop, said second diode also serving to prevent actuating current from being applied to said flip-flop when the output signal received is in a low level state.

13. In a direct-current pulse gating system wherein input pulses are produced for actuating receiving flip-flop stages to assume one of two stable states representing a predetermined logical condition specified in terms of the output signals of certain driving flip-flop stages, each driving flip-flop stage producing output signals having a high value E*h* for one digital condition and a low level output signal E*l* for a second digital condition, all of the receiving flip-flops being actuated in response to synchronizing pulses C*p*, the improvcment comprising: first means including at least one Zener diode having a breakdown potential selected to be between said potential E*h* and said potential E*l*; second means having one end conductively coupled to one end of said first means and having the other end conductively coupled to one of said flip-flop stages, said first means having its other end coupled to the other of said flip-flop stages; third means having one end coupled to the junction of said first and second means having a direct-current impedance substantially greater than the impedance of said Zener diode during its breakdown condition; and fourth means for applying synchronizing pulses C*p* to the other end of said third means, said synchronizing pulses C*p* being selected to cause the direct-current voltage at said junction to vary between levels causing a breakdown of said Zener diode for one of two predetermined logical conditions and to fail to cause a breakdown for the other of the two logical conditions.

References Cited in the file of this patent

UNITED STATES PATENTS

| | | |
|---|---|---|
| 2,576,026 | Meacham | Nov. 20, 1951 |
| 2,580,771 | Harper | Jan. 1, 1952 |
| 2,618,753 | Mierlo | Nov. 18, 1952 |
| 2,636,133 | Hussey | Apr. 21, 1953 |
| 2,644,887 | Wolfe | July 7, 1953 |
| 2,647,238 | Bailey | July 28, 1953 |
| 2,655,608 | Valdez | Oct. 13, 1953 |
| 2,659,815 | Curtis | Nov. 17, 1953 |
| 2,673,936 | Harris | Mar. 30, 1954 |
| 2,685,049 | Steinberg | July 27, 1954 |
| 2,714,702 | Shockley | Aug. 2, 1955 |
| 2,716,729 | Shockley | Aug. 30, 1955 |

FOREIGN PATENTS

| | | |
|---|---|---|
| 1,101,876 | France | Apr. 27, 1955 |

OTHER REFERENCES

Diode Cioncidence and Mixing Circuits in Digital Computers, Chen, Proceedings of the I.R.E., May 1950, pp. 511–514.

UNITED STATES PATENT OFFICE

CERTIFICATE OF CORRECTION

Patent No. 2,965,767 December 20, 1960

Cravens L. Wanlass

It is hereby certified that error appears in the above numbered patent requiring correction and that the said Letters Patent should read as corrected below.

Column 1, line 22, for "problems" read -- problem --; line 28, for "differenet" read -- different --; column 3, lines 36 and 37, for "Bener", each occurrence, read -- Zener --; column 8, line 27, for "level" read -- levels --; column 11, line 24, for "$O_D$=" read -- $O_L$= --.

Signed and sealed this 1st day of May 1962.

(SEAL)
Attest:

ERNEST W. SWIDER
Attesting Officer

DAVID L. LADD
Commissioner of Patents